(12) United States Patent
Saito et al.

(10) Patent No.: US 12,327,663 B2
(45) Date of Patent: Jun. 10, 2025

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 249 days.

(21) Appl. No.: 18/025,693

(22) PCT Filed: Jul. 29, 2021

(86) PCT No.: PCT/JP2021/028024
§ 371 (c)(1),
(2) Date: Mar. 10, 2023

(87) PCT Pub. No.: WO2022/059356
PCT Pub. Date: Mar. 24, 2022

(65) Prior Publication Data
US 2023/0343485 A1     Oct. 26, 2023

(30) Foreign Application Priority Data
Sep. 16, 2020   (JP) .................... 2020-155431

(51) Int. Cl.
*H01B 7/18*      (2006.01)
*B60R 16/02*     (2006.01)
(Continued)

(52) U.S. Cl.
CPC ....... *H01B 7/1875* (2013.01); *B60R 16/0215* (2013.01); *H01B 7/285* (2013.01); *H02G 3/0481* (2013.01)

(58) Field of Classification Search
CPC .. B60R 6/0215; B60R 6/0222; H05K 9/0098; H05K 9/0018; H01R 13/6592; H01R 13/6593; H01B 7/0045; H02G 3/06
See application file for complete search history.

(56) References Cited

U.S. PATENT DOCUMENTS 9,161,482 B2 * 10/2015 Adachi ................ H01R 13/648
9,865,379 B2 *  1/2018 DePompeo .......... H01B 7/0045
(Continued)

FOREIGN PATENT DOCUMENTS

JP   2017-055570 A   3/2017
JP   2017-084547 A   5/2017
(Continued)

OTHER PUBLICATIONS

Oct. 19, 2021 International Search Report issued in International Patent Application No. PCT/JP2021/028024.

*Primary Examiner* — Paresh Paghadal
(74) *Attorney, Agent, or Firm* — Oliff PLC

(57) ABSTRACT

A wire harness including: an electric wire; a first tube that is made of a metal and covers an outer circumference of the electric wire; a braided wire that is formed by braiding conductive strands into a tubular shape, is attached to an outer circumferential surface of the first tube, and covers an outer circumference of a drawn-out portion of the electric wire, the drawn-out portion being drawn out from an end of the first tube; and a second tube that is made of a metal.

13 Claims, 3 Drawing Sheets

(51) Int. Cl.
*H01B 7/285* (2006.01)
*H02G 3/04* (2006.01)

(56) References Cited

U.S. PATENT DOCUMENTS

| | | | |
|---|---|---|---|
| 10,461,480 B1* | 10/2019 | Tanaka | H01R 13/655 |
| 2013/0087377 A1* | 4/2013 | Adachi | H01R 13/748 174/372 |
| 2013/0269981 A1* | 10/2013 | Shiga | H02G 3/06 174/136 |
| 2014/0202763 A1* | 7/2014 | Adachi | H02H 3/02 174/72 A |
| 2015/0008033 A1* | 1/2015 | Toyama | H01R 13/65912 174/72 A |
| 2015/0041175 A1 | 2/2015 | Nakai et al. | |
| 2015/0287497 A1* | 10/2015 | Shiga | B60R 16/0215 174/84 R |
| 2016/0100509 A1* | 4/2016 | Yanagihara | H05K 9/0098 174/350 |
| 2016/0126709 A1 | 5/2016 | Maeda | |
| 2017/0076841 A1 | 3/2017 | Nakai et al. | |
| 2017/0148546 A1* | 5/2017 | Nakai | H02G 3/06 |
| 2017/0181337 A1* | 6/2017 | Itani | H02G 3/0462 |
| 2018/0008033 A1* | 1/2018 | Dahlberg | A46B 13/001 |
| 2019/0380233 A1 | 12/2019 | Shimizu et al. | |
| 2019/0393686 A1* | 12/2019 | Hiromori | H02G 3/0616 |
| 2020/0083695 A1* | 3/2020 | Nakai | H01B 7/00 |
| 2024/0174188 A1* | 5/2024 | Hiromori | B60R 16/02 |

FOREIGN PATENT DOCUMENTS

| | | | | |
|---|---|---|---|---|
| WO | WO-2018139267 A1 | * | 8/2018 | ............... H01B 7/00 |
| WO | WO-2018190096 A1 | * | 10/2018 | ............... H01B 7/00 |

* cited by examiner

WIRE HARNESS

BACKGROUND

The present disclosure relates to a wire harness.

Wire harnesses having electric wires formed by connecting a single-core wire and a stranded wire to each other have been conventionally known as wire harnesses to be routed in vehicles such as hybrid cars and electric cars (see JP 2017-84547A, for example).

The wire harness disclosed in JP 2017-84547A includes a shield pipe that covers the outer circumference of a connection portion where a single-core wire and a stranded wire are connected to each other, and a protector that is fixed to an end portion of the shield pipe and attached to the electric wire. At the connection portion, the single-core wire and the stranded wire overlap each other and are connected through, for example, soldering or welding. Note that the protector is referred to as the "positioning member" in JP 2017-84547A.

The protector has a tubular portion having a cylindrical shape, a band-shaped attachment piece that protrudes from one end of the tubular portion in the axial direction, and a locking projection that protrudes from the outer circumferential surface of the tubular portion. The tubular portion and the attachment piece are located inside the shield pipe.

The electric wire is inserted into the tubular portion. The protector is attached to the electric wire by winding tape around the attachment piece and the electric wire inserted into the tubular portion together. The locking projection is configured to be capable of being locked to a locking-target portion provided at an end portion of the shield pipe. The locking-target portion is a hole that passes through the end portion of the shield pipe in the thickness direction. The protector is fixed to the end portion of the shield pipe by locking the locking projection and the locking-target portion to each other.

SUMMARY

Since the protector is located inside the shield pipe, the shield pipe needs to have an inner diameter larger than the outer diameter of the protector. In this case, the outer diameter of the shield pipe may be increased as the inner diameter of the shield pipe is increased. This may lead to an increase in the entire size of the wire harness.

An exemplary aspect of the disclosure provides a wire harness capable of suppressing an increase in the size.

A wire harness of the present disclosure includes: an electric wire; a first tube that is made of a metal and covers an outer circumference of the electric wire; a braided wire that is formed by braiding conductive strands into a tubular shape, is attached to an outer circumferential surface of the first tube, and covers an outer circumference of a drawn-out portion of the electric wire, the drawn-out portion being drawn out from an end of the first tube; a second tube that is made of a metal and includes: a first end covering an outer circumference of the first tube with the braided wire being sandwiched between the first end and the outer circumferential surface of the first tube; and a second end located on a side opposite to the first end and covering the outer circumference of the drawn-out portion, and fixes the braided wire to the outer circumferential surface of the first tube; and a protector that is fixed to an inner circumferential surface of the second tube and protects the drawn-out portion by covering the outer circumference of the drawn-out portion, wherein the second tube has a protrusion that protrudes from the inner circumferential surface of the second tube toward the outer circumferential surface of the first tube and presses the braided wire against the outer circumferential surface of the first tube.

With the present disclosure, an increase in the size of a wire harness can be suppressed.

DETAILED DESCRIPTION OF EMBODIMENTS

Figure 1:
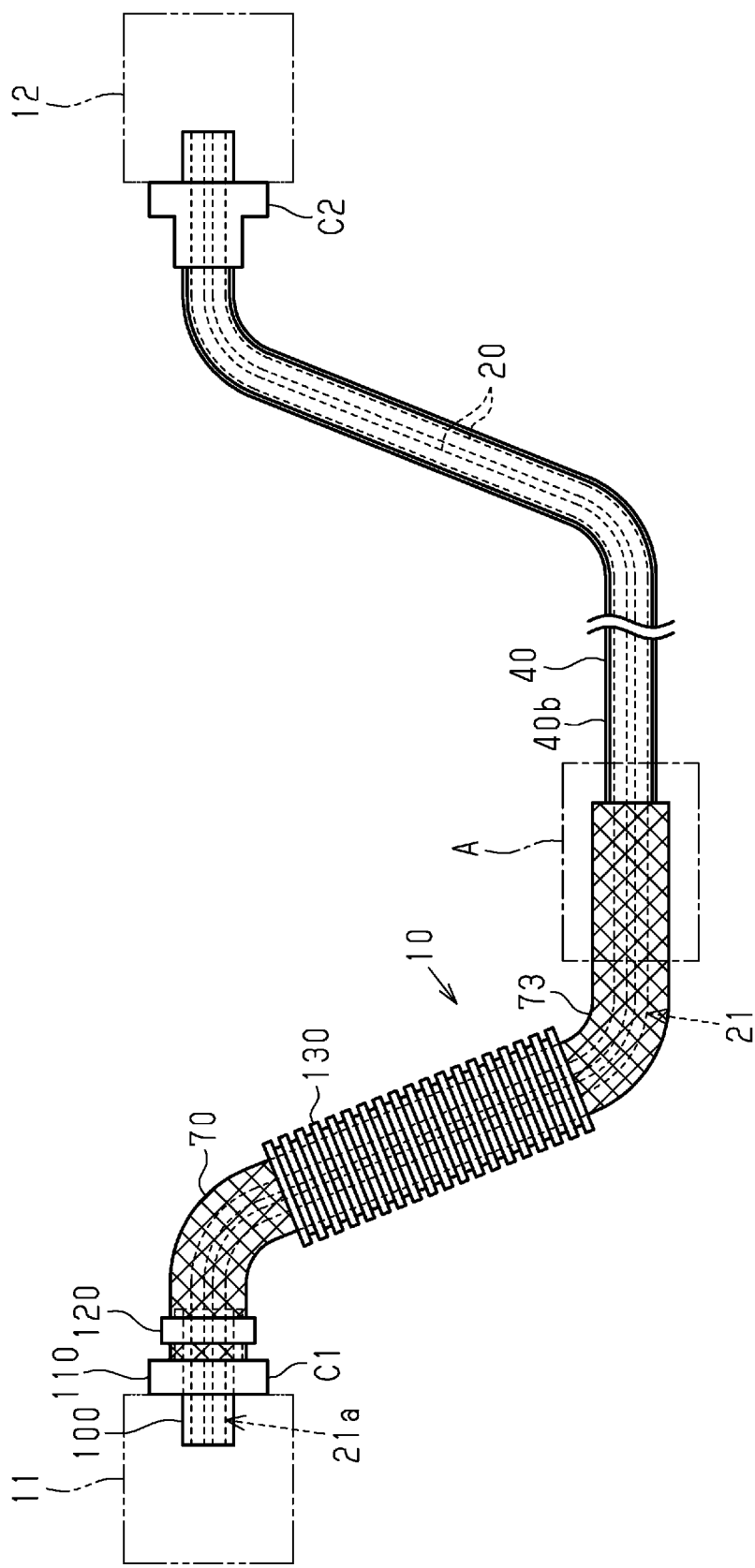
FIG. 1 is a schematic configuration diagram showing a wire harness according to an embodiment.

Description of Embodiments of the Present Disclosure

First, aspects of the present disclosure will be listed and described.

[1] A wire harness of the present disclosure includes: an electric wire member; a first tubular member that is made of a metal and covers an outer circumference of the electric wire member; a braided wire that is formed by braiding conductive strands into a tubular shape, is attached to an outer circumferential surface of the first tubular member, and covers an outer circumference of a drawn-out portion of the electric wire member, the drawn-out portion being drawn out from an end portion of the first tubular member; a second tubular member that is made of a metal, has: a first end portion covering an outer circumference of the first tubular member with the braided wire being sandwiched between the first end portion and the outer circumferential surface of the first tubular member; and a second end portion located on a side opposite to the first end portion and covering the outer circumference of the drawn-out portion, and fixes the braided wire to the outer circumferential surface of the first tubular member; and a protector that is fixed to an inner circumferential surface of the second tubular member and protects the drawn-out portion by covering the outer circumference of the drawn-out portion, wherein the second tubular member has a protruding portion that protrudes from the inner circumferential surface of the second tubular member toward the outer circumferential surface of the first tubular member and presses the braided wire against the outer circumferential surface of the first tubular member.

With this configuration, the protector covering the outer circumference of the drawn-out portion is fixed to the inner circumferential surface of the second tubular member. Accordingly, compared with a configuration in which the protector is fixed to the inner circumferential surface of the first tubular member, the inner diameter of the first tubular member can be reduced, thus making it possible to reduce the outer diameter of the first tubular member. Therefore, an increase in the size of the wire harness can be suppressed.

Also, with the configuration above, the protruding portion of the second tubular member presses the braided wire against the outer circumferential surface of the first tubular member, and thus the braided wire and the first tubular member are electrically connected to each other. Accordingly, a dedicated member for fixing the braided wire to the first tubular member need not be used. Therefore, an increase in the number of components in the wire harness can be suppressed.

[2] It is preferable that, in the electric wire member, a portion covered by the first tubular member is longer than a portion covered by the second tubular member.

With this configuration, the proportion of the first tubular member in the longitudinal direction of the wire harness is larger than the proportion of the second tubular member. Therefore, an increase in the size of the wire harness is remarkably suppressed by reducing the outer diameter of the first tubular member.

[3] It is preferable that the first tubular member, the second tubular member, and the braided wire are all made of an aluminum alloy.

With this configuration, the first tubular member, the second tubular member, and the braided wire are made of the same type of metal material. Accordingly, at a contact portion where the first tubular member and the braided wire are in contact with each other and a contact portion where the braided wire and the second tubular member are in contact with each other, it is possible to suppress galvanic corrosion, which is caused by the infiltration of water between different types of metals. Thus, there is no need to provide separate exterior members for covering the outer circumferences of these contact portions in order to suppress the infiltration of water into the contact portions. Therefore, both an increase in the size of the wire harness and an increase in the number of components in the wire harness can be suppressed.

[4] It is preferable that the protruding portion is provided over the entire length in a circumferential direction of the second tubular member.

With this configuration, the protruding portion presses the braided wire against the outer circumferential surface of the first tubular member over the entire length in the circumferential direction. Accordingly, the connection reliability of electrical connection between the braided wire and the first tubular member can be improved.

[5] It is preferable that the braided wire has: a first portion that is located between the outer circumferential surface of the first tubular member and the inner circumferential surface of the second tubular member; a second portion that is continuous with the first portion, is drawn out in a direction opposite to a direction in which the drawn-out portion is drawn out from the first end portion, and is folded back toward an outer circumference of the second tubular member; and a third portion that is continuous with the second portion and extends in the direction in which the drawn-out portion is drawn out.

During assembly of the wire harness that includes the braided wire covering the outer circumference of the drawn-out portion, the drawn-out portion may be attached to a housing of a connector to be connected to an in-vehicle apparatus, and the protector covering the outer circumference of the drawn-out portion may be fixed to the second tubular member. In this case, the braided wire may interfere with the above-mentioned operations.

Here, it is conceivable that the above-mentioned operations are performed in a state in which the braided wire is folded back toward the outer circumference of the first tubular member. However, in this case, after the above-mentioned operations are finished, it is necessary to unfold the braided wire and cover the outer circumference of the drawn-out portion with the braided wire again. Accordingly, workability for assembly of the wire harness may be impaired.

In this respect, with the configuration above, the braided wire fixed to the outer circumferential surface of the first tubular member is drawn out from the first end portion and folded back toward the outer circumference of the second tubular member. Thus, the braided wire extends in a direction in which the drawn-out portion is drawn out, while covering the outer circumference of the second tubular member. Accordingly, when the braided wire is not folded back toward the outer circumference of the second tubular member, the braided wire extends in a direction opposite to the direction in which the drawn-out portion is drawn out, and covers the outer circumference of the first tubular member. At this time, the braided wire does not cover the drawn-out portion, the protector, and the second tubular member.

As described above, during the assembly of the wire harness, the above-mentioned operations can be easily performed by attaching the braided wire to the first tubular member such that the braided wire covers the outer circumference of the first tubular member. Then, the braided wire is folded back toward the outer circumference of the second tubular member after the above-mentioned operations are finished. In such a procedure, the braided wire needs to be folded back only once. Therefore, it is possible to suppress the impairment of workability for assembly of the wire harness.

[6] It is preferable that the wire harness further includes a tape member that is wound around an outer circumferential surface of the first end portion of the second tubular member and the second portion of the braided wire.

With this configuration, the tape member covers the edge of the first end portion of the second tubular member, thus making it possible to suppress abrasion of the braided wire caused by contact with this edge.

[7] It is preferable that the wire harness further includes: a housing that houses an end portion of the drawn-out portion; a shield shell that covers an outer circumference of the housing and to which the braided wire is connected; and a fixing member that fixes the braided wire to an outer surface of the shield shell, wherein the braided wire, the shield shell, and the fixing member are all made of an aluminum alloy.

With this configuration, the braided wire, the shield shell, and the fixing member are made of the same type of metal material. Accordingly, at a contact portion where the shield shell and the braided wire are in contact with each other and a contact portion where the braided wire and the fixing member are in contact with each other, it is possible to suppress galvanic corrosion, which is caused by the infiltration of water between different types of metals. Thus, there is no need to provide separate exterior members for covering the outer circumferences of these contact portions in order to suppress the infiltration of water into the contact portions. Therefore, both an increase in the size of the wire harness and an increase in the number of components in the wire harness can be suppressed.

[8] It is preferable that the wire harness further includes a sealing member that is provided inside the end portion of the first tubular member and seals a space between an outer circumferential surface of the electric wire member and an inner circumferential surface of the first tubular member from water.

With this configuration, it is possible to suppress the infiltration of water into the first tubular member through the end portion of the first tubular member.

[9] It is preferable that the protector faces the sealing member in an axial direction of the first tubular member.

With this configuration, when the sealing member moves toward the protector in the axial direction of the first tubular member, the sealing member comes into contact with a portion of the protector that faces the sealing member. Accordingly, it is possible to suppress the dislodgement of the sealing member from the first tubular member. Therefore, it is possible to suppress the impairment of the water sealing properties of the first tubular member.

[10] It is preferable that the protector is in contact with the sealing member in the axial direction of the first tubular member.

With this configuration, it is possible to further suppress the dislodgement of the sealing member from the first tubular member. Therefore, it is possible to further suppress the impairment of the water sealing properties of the first tubular member.

[11] It is preferable that the first tubular member has a protrusion that protrudes from the inner circumferential surface of the first tubular member, and the protrusion is located on the inside of the sealing member in the axial direction of the first tubular member and faces the sealing member.

With this configuration, when the sealing member moves inward in the axial direction of the first tubular member, the sealing member comes into contact with the protrusion. Accordingly, it is possible to suppress the movement of the sealing member inward in the axial direction. Therefore, it is possible to perform positioning of the sealing member.

[12] It is preferable that the electric wire member has a first electric wire and a second electric wire that is electrically connected to the first electric wire, the first electric wire has a single-core wire constituted by a single conductor, and an insulating coating that covers an outer circumference of the single-core wire, the second electric wire has a stranded wire formed by twisting a plurality of metal strands, and an insulating coating that covers an outer circumference of the stranded wire, and a connection portion where the first electric wire drawn out from the end portion of the first tubular member and the second electric wire located outside the first tubular member are electrically connected to each other is provided at a portion of the drawn-out portion in a longitudinal direction.

Since the single-core wire and the stranded wire overlap each other at the connection portion, the size of the cross section of the connection portion may increase. Accordingly, for example, if the first tubular member covers the outer circumference of the connection portion, the inner diameter of the first tubular member needs to be larger than the size of the cross section of the connection portion.

In this respect, with the configuration above, the connection portion is provided at a portion in the longitudinal direction of the drawn-out portion. That is to say, the connection portion is located outside the first tubular member. Accordingly, even if the size of the cross section of the connection portion increases, there is no need to increase the inner diameter of the first tubular member. Thus, compared with a configuration in which the first tubular member covers the outer circumference of the connection portion, the inner diameter of the first tubular member can be reduced, thus making it possible to reduce the outer diameter of the first tubular member. Therefore, an increase in the size of the wire harness can be further suppressed.

[13] It is preferable that the protector covers an outer circumference of the connection portion.

With this configuration, it is possible to suppress the interference of the connection portion with objects located around the wire harness.

[14] It is preferable that the protector has a fixation portion to which the drawn-out portion is fixed.

With this configuration, the drawn-out portion is fixed to the fixation portion, thus making it possible to suppress a change in the length of the drawn-out portion drawn out from the end portion of the first tubular member.

[15] It is preferable that the protector has a fixation portion to which the drawn-out portion is fixed, and the fixation portion is provided at a position that is farther from the end portion of the first tubular member than a portion of the protector that covers the outer circumference of the connection portion is, in the longitudinal direction of the drawn-out portion.

With this configuration, a portion of the drawn-out portion that is fixed to the fixation portion is farther from the end portion of the first tubular member than the connection portion is. Accordingly, even if an external force acts on the drawn-out portion, it is possible to suppress the transmission of the external force to the connection portion. Therefore, it is possible to suppress the impairment of the connection reliability of the connection portion.

Also, with the configuration above, the drawn-out portion is fixed to the fixation portion, thus making it easy to control the length of the drawn-out portion drawn out from the end portion of the first tubular member.

Details of Embodiments of the Present Disclosure

The following describes specific embodiments of a wire harness of the present disclosure with reference to the drawings. Portions of the configuration may be exaggerated or simplified in the diagrams for convenience in the description. In addition, the ratios between the dimensions of portions shown in the diagrams may be different from each other. Note that the present disclosure is not limited to these embodiments and is defined by the scope of the appended claims, and all changes that fall within the same essential spirit as the scope of the claims are intended to be included therein. The "tubular shape" as used herein need only be a shape that can be considered as a tubular shape as a whole, and encompasses a tubular shape constituted by a combination of a plurality of components, and a shape provided with a cutout portion such as a C-shape.

Overall Configuration of Wire Harness 10

As shown in FIG. 1, a wire harness 10 electrically connects two or three or more electric apparatuses. For example, the wire harness 10 electrically connects an inverter 11 that is provided in a front portion of a vehicle such as a hybrid car or electric car, and a high-voltage battery 12 that is provided on a vehicle-rear side with respect to the inverter 11. For example, the intermediate portion in the longitudinal direction of the wire harness 10 is routed under the floor of the vehicle.

The inverter 11 is connected to a wheel drive motor (not illustrated) that is a power source for the traveling of the vehicle. The inverter 11 generates AC power from DC power provided by the high-voltage battery 12, and supplies the AC power to the motor. The high-voltage battery 12 can supply a voltage of several hundred volts, for example.

The wire harness 10 includes one or more electric wire members 20 (electric wire members), a first tubular member 40 (first tube) that covers the outer circumferences of the electric wire members 20, and a braided wire 70 that is attached to an outer circumferential surface 40b of the first tubular member 40. The wire harness 10 according to this embodiment includes two electric wire members 20. The electric wires 20 may be, for example, shielded electric wires having an electromagnetic shield structure, or non-shielded electric wires having no electromagnetic shield structure.

Figure 2:
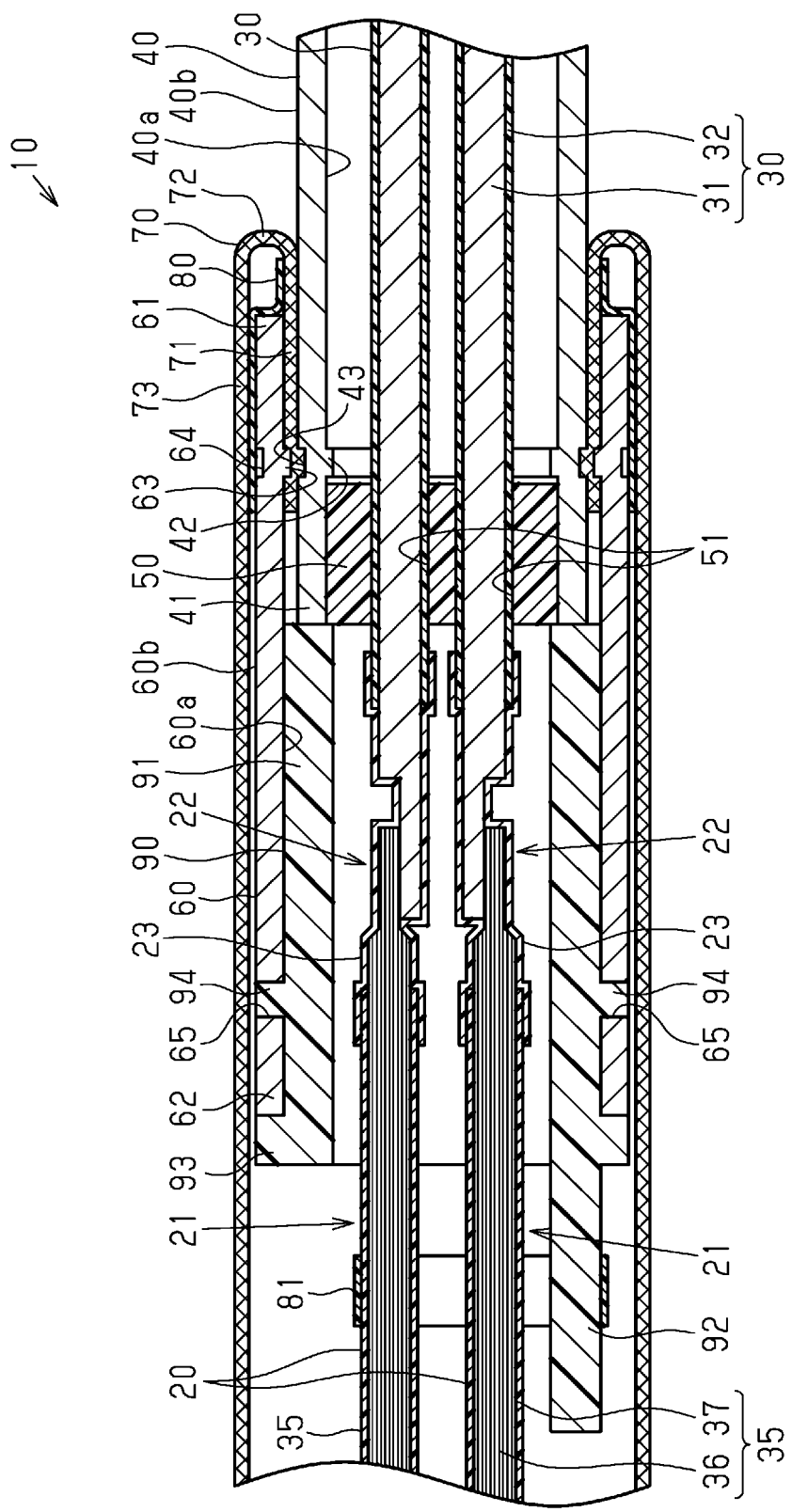
FIG. 2 is a cross-sectional view of a portion A in FIG. 1.

As shown in FIG. 2, the wire harness 10 further includes a second tubular member 60 (second tube) that fixes the braided wire 70 to the outer circumferential surface 40b of the first tubular member 40, and a protector 90 that is fixed to the inner circumferential surface 60a of the second tubular member 60.

The outer circumferences of the electric wire members 20 are covered by the first tubular member 40 and the second tubular member 60. In each electric wire member 20, a portion covered by the first tubular member 40 is longer than a portion covered by the second tubular member 60. In this embodiment, the first tubular member 40 is longer than the second tubular member 60.

As shown in FIG. 1, a connector C1 and a connector C2 are respectively attached to the ends on one side of the electric wire members 20 and the ends on the other side of the electric wire members 20. The ends on one side of the electric wire members 20 are connected to the inverter 11 via the connector C1. The ends on the other side of the electric wire members 20 are connected to the high-voltage battery 12 via the connector C2.

The wire harness 10 further includes a housing 100 that houses ends on one side of the electric wire members 20, a shield shell 110 that covers the outer circumference of the housing 100, and a fixing member 120 that fixes the braided wire 70 to the outer surface of the shield shell 110. The housing 100, the shield shell 110, and the fixing member 120 form the connector C1.

Configuration of Electric Wire Member 20

As shown in FIG. 2, the electric wire members 20 each have a first electric wire 30, and a second electric wire 35 that is electrically connected to the first electric wire 30. For example, the first electric wire 30 is provided in a portion of the wire harness 10 that is to be routed under the floor of a vehicle. The second electric wire 35 is connected to an end of the first electric wire 30.

The electric wire member 20 has a drawn-out portion 21 that is drawn out from an end portion 41 of the first tubular member 40. A connection portion 22 (connection) where an end of the first electric wire 30 and an end of the second electric wire 35 are electrically connected to each other is provided at a portion in the longitudinal direction of the drawn-out portion 21.

The outer circumference of the connection portion 22 is covered by, for example, an insulating covering member 23 such as a heat-shrinkable tube. Examples of the covering member 23 include a hot-melt adhesive, a resin mold, and a tape member.

Configuration of First Electric Wire 30

The first electric wire 30 has, for example, a single-core wire 31 constituted by a single conductor, and an insulating coating 32 that covers the outer circumference of the single-core wire 31. Examples of the single-core wire 31 include a columnar conductor constituted by a single columnar metal rod having a solid structure, and a tubular conductor having a hollow structure. Examples of the material of the single-core wire 31 include metal materials such as copper-based materials and aluminum-based materials. The single-core wire 31 according to this embodiment is made of an aluminum alloy. The single-core wire 31 is formed through, for example, extrusion molding.

The lateral cross-sectional shape of the single-core wire 31 may be a desired shape. The lateral cross-sectional shape of the single-core wire 31 may be, for example, a circular shape, a semicircular shape, a polygonal shape, a square shape, or a flat shape. The lateral cross-sectional shape according to the single-core wire 31 according to this embodiment is a circular shape. That is to say, the single-core wire 31 according to this embodiment is formed in a cylindrical shape.

The insulating coating 32 covers, for example, the outer circumferential surface of the single-core wire 31 over the entire length in the circumferential direction. The insulating coating 32 is made of, for example, an insulating material such as a synthetic resin. Examples of the material of the insulating coating 32 include synthetic resins containing, as a main component, a polyolefin-based resin such as cross-linked polyethylene or cross-linked polypropylene. The materials of the insulating coating 32 may be used alone or appropriately in combination of two or more. For example, the insulating coating 32 is formed on the single-core wire 31 through extrusion molding.

At an end of the first electric wire 30, the single-core wire 31 is exposed from the insulating coating 32. The portion of the single-core wire 31 that is exposed from the insulating coating 32 is pressed into, for example, a flat shape.

Configuration of Second Electric Wire 35

For example, the second electric wire 35 has a stranded wire 36 formed by twisting a plurality of metal strands, and an insulating coating 37 that covers the outer circumference of the stranded wire 36. Examples of the material of the stranded wire 36 include metal materials such as copper-based materials and aluminum-based materials. The stranded wire 36 according to this embodiment is made of an aluminum alloy.

The lateral cross-sectional shape of the stranded wire 36 may be a desired shape. The lateral cross-sectional shape of the stranded wire 36 may be, for example, a circular shape, a semicircular shape, a polygonal shape, a square shape, or a flat shape. The lateral cross-sectional shape of the stranded wire 36 according to this embodiment is a circular shape.

The insulating coating 37 covers, for example, the outer circumferential surface of the stranded wire 36 over the entire length in the circumferential direction. The insulating coating 37 is made of, for example, an insulating material such as a synthetic resin. Examples of the material of the insulating coating 37 include synthetic resins containing, as a main component, a polyolefin-based resin such as cross-linked polyethylene or cross-linked polypropylene. The materials of the insulating coating 37 may be used alone or appropriately in combination of two or more. For example, the insulating coating 37 is formed on the stranded wire 36 through extrusion molding.

At an end of the second electric wire 35, the stranded wire 36 is exposed from the insulating coating 37. For example, the portion of the stranded wire 36 that is exposed from the insulating coating 37 is pressed into a flat shape as a whole.

The portion of the stranded wire 36 that is exposed from the insulating coating 37 and the portion of the single-core wire 31 that is exposed from the insulating coating 32 overlap each other and are joined to each other. The single-core wire 31 and the stranded wire 36 are joined using, for example, a well-known technique such as ultrasonic joining or resistance welding. The above-described connection portion 22 is formed by joining the stranded wire 36 and the single-core wire 31. The above-described covering member 23 is provided between an end of the insulating coating 32 and an end of the insulating coating 37. Therefore, the covering member 23 covers the outer circumference of the portion of the single-core wire 31 that is exposed from the insulating coating 32 and the outer circumference of the portion of the stranded wire 36 that is exposed from the insulating coating 37.

Configuration of First Tubular Member 40

The first tubular member 40 has, for example, a cylindrical shape. The first tubular member 40 is bent into, for example, a shape extending along the wiring path of the electric wire member 20. For example, the first tubular member 40 extends in the front-rear direction of a vehicle under the floor of the vehicle. The first tubular member 40 covers the outer circumferences of portions of the electric wire members 20 that are to be routed under the floor of a vehicle. The first tubular member 40 according to this embodiment covers the outer circumferences of the first electric wires 30 that are to be routed under the floor of a vehicle.

Examples of the material of the first tubular member 40 include metal materials such as copper-based materials and aluminum-based materials. The first tubular member 40 according to this embodiment is made of an aluminum alloy.

The first tubular member 40 has a protrusion 42 that protrudes from the inner circumferential surface 40*a* of the first tubular member 40. The protrusion 42 is provided at a position that is located inside the first tubular member 40 and spaced apart from the opening at the end portion 41 in the axial direction of the first tubular member 40. The protrusion 42 is provided over the entire length in the circumferential direction of the first tubular member 40. Therefore, a portion of the first tubular member 40 that is provided with the protrusion 42 has a cross-sectional area smaller than the cross-sectional area of the rest. The cross-sectional area of the rest above is substantially constant in the axial direction of the first tubular member 40.

The outer circumferential surface 40*b* of the first tubular member 40 is provided with a recessed portion 43 at a portion corresponding to the protrusion 42. The recessed portion 43 is provided over the entire length in the circumferential direction of the first tubular member 40.

As shown in FIG. 1, in this embodiment, an end portion of the first tubular member 40 that is located on a side opposite to the end portion 41 is electrically connected to the connector C2. Note that the end portion may be connected to the connector C2 via a braided wire different from the braided wire 70. In this case, the outer circumference of the braided wire may be covered by, for example, an exterior member such as a grommet.

Configuration of Sealing Member 50

As shown in FIG. 2, the wire harness 10 further includes a sealing member 50 (seal) that seals a space between the outer circumferential surfaces of the electric wire members 20 and the inner circumferential surface 40*a* of the first tubular member 40 from water. The sealing member 50 according to this embodiment seals a space between the outer circumferential surfaces of the first electric wires 30 and the inner circumferential surface 40*a* of the first tubular member 40. The sealing member 50 has, for example, a cylindrical shape as a whole.

The sealing member 50 is provided inside the end portion 41 of the first tubular member 40. The sealing member 50 is located inside the end portion 41 at a position that is closer to the opening at the end portion 41 than the protrusion 42 is. The sealing member 50 faces the protrusion 42 in the axial direction of the first tubular member 40. For example, a rubber stopper can be used as the sealing member 50.

The sealing member 50 is provided with two insertion holes 51 through which the first electric wires 30 are to be inserted. The sealing member 50 comes into intimate contact with the inner circumferential surface 40*a* of the first tubular member 40 as well as the outer circumferential surfaces of the first electric wires 30.

Configuration of Second Tubular Member 60

The second tubular member 60 has a cylindrical shape with an inner diameter larger than the outer diameter of the first tubular member 40. The second tubular member 60 is fixed to the outer circumferential surface 40*b* of the first tubular member 40 with the braided wire 70 being sandwiched between the second tubular member 60 and the outer circumferential surface 40*b* of the first tubular member 40.

Examples of the material of the second tubular member 60 include metal materials such as copper-based materials and aluminum-based materials. The second tubular member 60 according to this embodiment is made of an aluminum alloy.

The second tubular member 60 has a first end portion 61, and a second end portion 62 that is located on a side opposite to the first end portion 61 in the axial direction of the second tubular member 60. The first end portion 61 covers the outer circumference of the first tubular member 40 with the braided wire 70 being sandwiched between the first end portion 61 and the outer circumferential surface 40*b* of the first tubular member 40. The second end portion 62 covers the outer circumferences of portions of the drawn-out portions 21 that are farther from the end portion 41 of the first tubular member 40 than the connection portions 22 are. Therefore, the outer circumferences of the connection portions 22 are covered by the second tubular member 60.

The second tubular member 60 has a protruding portion 63 (protrusion) that protrudes toward the outer circumferential surface 40*b* of the first tubular member 40 from the inner circumferential surface 60*a* of the second tubular member 60. The protruding portion 63 is provided at a position that is located inside the second tubular member 60 and spaced apart from the opening at the first end portion 61 in the axial direction of the second tubular member 60. More specifically, the protruding portion 63 is provided at a position corresponding to the recessed portion 43 of the first tubular member 40. The protruding portion 63 is provided over the entire length in the circumferential direction of the second tubular member 60. The width of the protruding portion 63 is slightly smaller than the width of the recessed portion 43 of the first tubular member 40.

The protruding portion 63 presses the braided wire 70 against the outer circumferential surface 40*b* of the first tubular member 40. More specifically, the protruding portion 63 presses the braided wire 70 against the inner surface of the recessed portion 43 of the first tubular member 40. Thus, the braided wire 70 and the first tubular member 40 are electrically connected to each other.

The protruding portion 63 is engaged with the recessed portion 43 with the braided wire 70 being sandwiched between the protruding portion 63 and the recessed portion 43. The second tubular member 60 is fixed to the first tubular member 40 as a result of the protruding portion 63 being engaged with the recessed portion 43.

The outer circumferential surface 60*b* of the second tubular member 60 is provided with a recessed portion 64 at a portion corresponding to the protruding portion 63. The recessed portion 64 is provided over the entire length in the circumferential direction of the second tubular member 60.

The protruding portion 63 and the recessed portion 64 according to this embodiment are formed as follows, for example: a jig (not illustrated) and the second tubular member 60 are rotated relative to each other while the jig is brought into contact with the outer circumferential surface 60b of the second tubular member 60, and the second tubular member 60 is thus plastically deformed to locally reduce the diameter. Examples of such a plastic deformation method include a spinning processing method and a swaging processing method. In this embodiment, the protruding portion 63 is formed by performing the swaging processing method on the second tubular member 60 with the braided wire 70 being sandwiched between the second tubular member 60 and the outer circumferential surface 40b of the first tubular member 40. As the protruding portion 63 is being formed, a portion of the first tubular member 40 corresponding to the protruding portion 63 is plastically deformed to reduce the diameter. Thus, the recessed portion 43 is formed on the outer circumferential surface 40b of the first tubular member 40, and the protrusion 42 is formed on the inner circumferential surface 40a of the first tubular member 40.

The second tubular member 60 is provided with two through holes 65 that pass through the second tubular member 60 in the thickness direction. The through holes 65 are lined up in the radial direction of the second tubular member 60. The through holes 65 are formed in a portion of the second tubular member 60 that covers the outer circumferences of the drawn-out portions 21 and is located on the inside with respect to the opening at the second end portion 62 in the axial direction of the second tubular member 60.

Configuration of Braided Wire 70

The braided wire 70 is formed by, for example, braiding conductive strands into a tubular shape. The braided wire 70 is provided so as to cover the outer circumferences of the drawn-out portions 21 over substantially the entire lengths in the longitudinal direction of the drawn-out portions 21. Examples of the braided wire 70 include a braided wire obtained by braiding a plurality of types of metal strands, and a braided wire obtained by braiding metal strands and resin strands in combination. For example, a metal material such as a copper-based material or an aluminum-based material can be used as a material of metal strands. For example, reinforced fibers such as para-aramid fibers that have excellent insulating properties and excellent shearing resistance can be used as the resin strands. The stranded wire 70 according to this embodiment is formed by braiding metal strands made of an aluminum alloy into a tubular shape.

The braided wire 70 has a first portion 71 that includes one end of the braided wire 70, a second portion 72 that is continuous with the first portion 71, and a third portion 73 that is continuous with the second portion 72.

The first portion 71 is located between the outer circumferential surface 40b of the first tubular member 40 and the inner circumferential surface 60a of the second tubular member 60. Apart of the first portion 71 is sandwiched between the recessed portion 43 of the first tubular member 40 and the protruding portion 63 of the second tubular member 60. This part is pressed against the recessed portion 43 by the protruding portion 63, and is thus flatter than the rest of the first portion 71.

The second portion 72 is drawn out in a direction opposite to the direction in which the drawn-out portions 21 are drawn out from the first end portion 61 of the second tubular member 60, and is folded back toward the outer circumference of the second tubular member 60.

The third portion 73 extends in the direction in which the drawn-out portions 21 are drawn out. The third portion 73 covers the outer circumference of the second tubular member 60 and the outer circumferences of the drawn-out portions 21. That is to say, the third portion 73 collectively covers the outer circumferences of the plurality of second electric wires 35. An end of the third portion 73 located on a side opposite to the second portion 72 is electrically connected to the shield shell 110.

As shown in FIG. 1, the outer circumference of a part in the longitudinal direction of the third portion 73 is covered by an exterior member 130. The exterior member 130 according to this embodiment is, for example, a corrugated tube having a bellows-like structure in which annular projecting portions and annular recessed portions are alternately and continuously provided.

Configuration of Tape Member 80

As shown in FIG. 2, the wire harness 10 further includes a tape member 80 (tape) that is wound around the outer circumferential surface of the first end portion 61 of the second tubular member 60 and the second portion 72 of the braided wire 70.

The tape member 80 has an adhesive layer on one surface in the thickness direction. The tape member 80 is wound around the outer circumferential surface of the first end portion 61 and the second portion 72 a plurality of times in a state in which the adhesive layer faces inward. Therefore, the edge of the first end portion 61 is covered by the tape member 80.

Configuration of Protector 90

Figure 3:
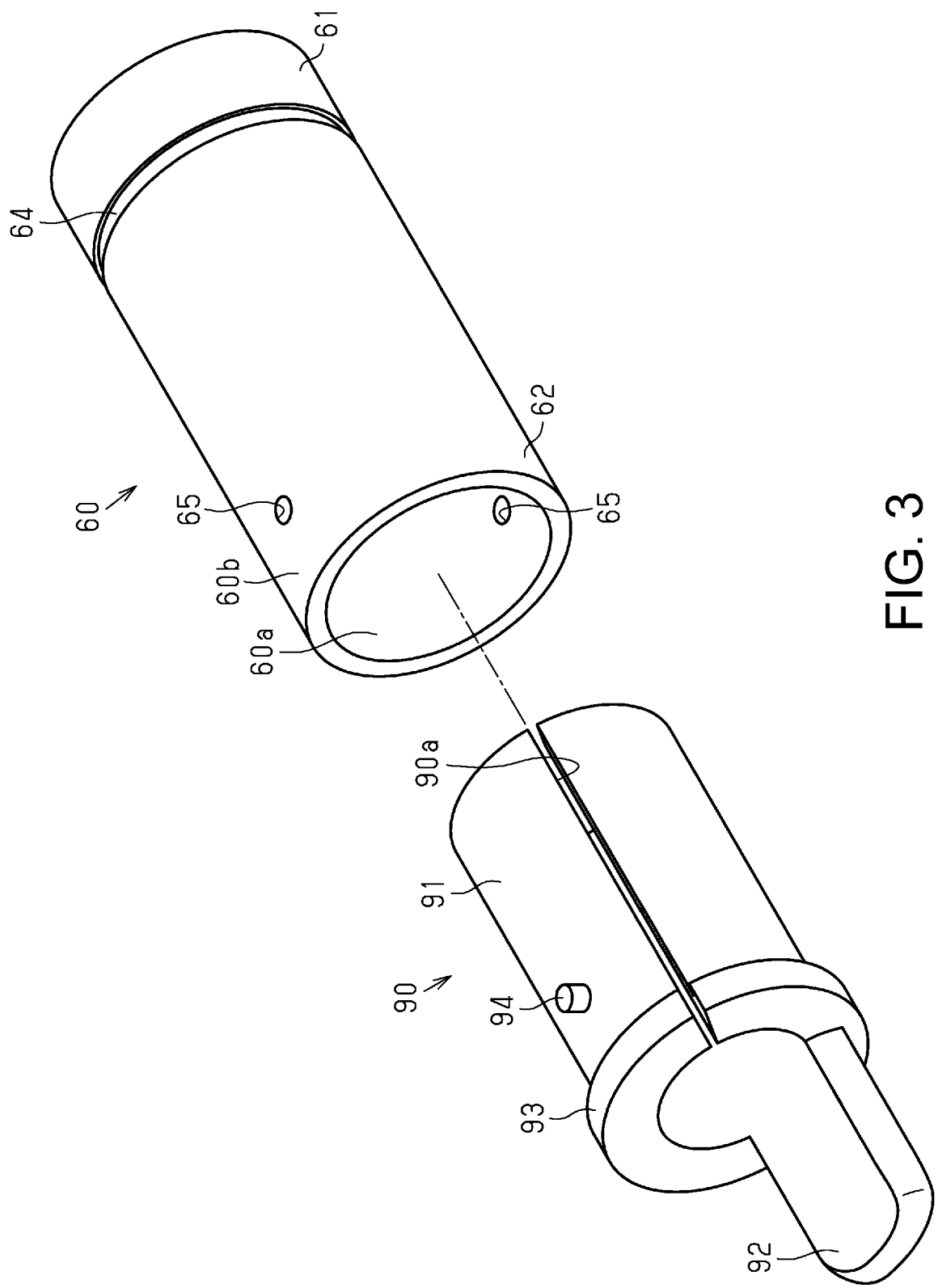
FIG. 3 is an exploded perspective view showing a state in which a first tubular member and a protector according to an embodiment are separated from each other.

As shown in FIGS. 2 and 3, the protector 90 is located outside the first tubular member 40 and fixed to the inner circumferential surface 60a of the second tubular member 60. The protector 90 is made of, for example, an insulating resin material.

The protector 90 has a cylindrical insertion portion 91 into which the drawn-out portions 21 are to be inserted, and a fixation portion 92 that protrudes from one end surface in the axial direction of the insertion portion 91 and to which the drawn-out portions 21 are to be fixed. The protector 90 also has an annular flange portion 93 that protrudes toward the outer circumferential side from the entire length of the circumference of the above-mentioned end of the insertion portion 91, and two engagement protrusions 94 that protrude from the outer circumferential surface of the insertion portion 91 in opposite directions. The engagement protrusions 94 are provided at positions spaced apart from the flange portion 93 in the axial direction of the insertion portion 91.

The protector 90 is provided with a slit 90a that extends over the entire length in the axial direction. The slit 90a extends across the insertion portion 91 and the flange portion 93. The protector 90 is configured to be elastically deformable such that the diameter is reduced by narrowing the gap of the slit 90a.

The insertion portion 91 covers the outer circumferences of portions of the drawn-out portions 21 that each include the connection portion 22. In other words, the outer circumferences of the connection portions 22 are covered by the insertion portion 91. A space is provided between the inner circumferential surface of the insertion portion 91 and the outer surfaces of the connection portions 22 along the entire circumference.

The inner diameter of the insertion portion 91 is smaller than the inner diameter of the first tubular member 40. That is to say, the insertion portion 91 faces the sealing member 50 in the axial direction of the first tubular member 40. In this embodiment, the inner circumferential portion at the other end surface of the insertion portion 91 on a side opposite to the above-mentioned one end surface comes into contact with the sealing member 50 in the axial direction of the first tubular member 40.

The outer diameter of the insertion portion 91 is larger than the outer diameter of the first tubular member 40.

Accordingly, the insertion portion 91 is thicker than the first tubular member 40. The outer diameter of the insertion portion 91 is substantially the same as the inner diameter of the second tubular member 60.

The fixation portion 92 protrudes in a direction away from the insertion portion 91 in the axial direction of the insertion portion 91. The fixation portion 92 is provided at a position that is farther from the end portion 41 of the first tubular member 40 than the insertion portion 91 is, in the longitudinal direction of the drawn-out portions 21. The fixation portion 92 is located outside the second tubular member 60. The fixation portion 92 is provided at a position different from that of the slit 90a in the circumferential direction of the insertion portion 91.

The lateral cross-sectional shape of the fixation portion 92 is, for example, a circular arc shape about the axis of the insertion portion 91. The inner surface of the fixation portion 92 is, for example, continuous and flush with the inner circumferential surface of the insertion portion 91.

A tape member 81 is used to fix, to the fixation portion 92, portions of the drawn-out portions 21 that are farther from the end portion 41 of the first tubular member 40 than the connection portions 22 are. More specifically, the tape member 81 is used to collectively fix the plurality of second electric wires 35 to the fixation portion 92. The tape member 81 is wound around the fixation portion 92 and the second electric wires 35 a plurality of times. Note that the tape member 81 may be of the same type as the above-described tape member 80, or of a different type from the tape member 80.

The outer diameter of the flange portion 93 is substantially the same as the outer diameter of the second tubular member 60. The flange portion 93 comes into contact with the end surface of the second end portion 62 of the second tubular member 60 in the axial direction of the insertion portion 91.

The engagement protrusions 94 are configured to be engageable with the through holes 65 of the second tubular member 60. The protector 90 is fixed to the inner circumferential surface 60a of the second tubular member 60 as a result of the engagement protrusions 94 being engaged with the through holes 65.

Configuration of Housing 100

As shown in FIG. 1, the housing 100 has, for example, a tubular shape. The housing 100 houses the end portions 21a of the drawn-out portions 21. The housing 100 holds the end portions 21a of the drawn-out portions 21. The housing 100 is made of, for example, an insulating resin material.

Configuration of Shield Shell 110

The shield shell 110 covers, for example, the outer circumference of a part of the housing 100. Examples of the material of the shield shell 110 include metal materials such as copper-based materials and aluminum-based materials. The shield shell 110 according to this embodiment is made of an aluminum alloy. The above-mentioned end of the third portion 73 of the braided wire 70 covers the outer circumference of a part of the shield shell 110.

Configuration of Fixing Member 120

The fixing member 120 has an annular shape and surrounds the outer surface of the above-mentioned part of the shield shell 110. The fixing member 120 according to this embodiment is a crimp ring. Examples of the material of the fixing member 120 include metal materials such as copper-based materials and aluminum-based materials. The fixing member 120 according to this embodiment is made of an aluminum alloy.

The braided wire 70 is fixed to the outer surface of the shield shell 110 by crimping the fixing member 120 to the shield shell 110 with the braided wire 70 being sandwiched between the fixing member 120 and the outer surface of the shield shell 110. Thus, the braided wire 70 and the shield shell 110 are electrically connected to each other.

The following is a description of the functions and effects of this embodiment.

(1) The wire harness 10 includes the electric wire members 20, the first tubular member 40 that is made of a metal and covers the outer circumferences of the electric wire members 20, and the braided wire 70 that is attached to the outer circumferential surface 40b of the first tubular member 40 and covers the outer circumferences of the drawn-out portions 21. The wire harness 10 further includes a second tubular member 60 that is made of a metal and fixes the braided wire 70 to the outer circumferential surface 40b of the first tubular member 40, and the protector 90 that is fixed to the inner circumferential surface 60a of the second tubular member 60 and covers the outer circumferences of the drawn-out portions 21. The second tubular member 60 has a protruding portion 63 that protrudes toward the outer circumferential surface 40b of the first tubular member 40 from the inner circumferential surface 60a of the second tubular member 60 and presses the braided wire 70 against the outer circumferential surface 40b of the first tubular member 40.

With this configuration, the protector 90 covering the outer circumferences of the drawn-out portions 21 is fixed to the inner circumferential surface 60a of the second tubular member 60. Accordingly, compared with a configuration in which the protector 90 is fixed to the inner circumferential surface 40a of the first tubular member 40, the inner diameter of the first tubular member 40 can be reduced, thus making it possible to reduce the outer diameter of the first tubular member 40. Therefore, an increase in the size of the wire harness 10 can be suppressed.

Also, with the configuration above, the protruding portion 63 of the second tubular member 60 presses the braided wire 70 against the outer circumferential surface 40b of the first tubular member 40, and thus the braided wire 70 and the first tubular member 40 are electrically connected to each other. Accordingly, a dedicated member for fixing the braided wire 70 to the first tubular member 40 need not be used. Therefore, an increase in the number of components in the wire harness 10 can be suppressed.

(2) In each electric wire member 20, a portion covered by the first tubular member 40 is longer than a portion covered by the second tubular member 60.

With this configuration, the proportion of the first tubular member 40 in the longitudinal direction of the wire harness 10 is larger than the proportion of the second tubular member 60. Therefore, an increase in the size of the wire harness 10 is remarkably suppressed by reducing the outer diameter of the first tubular member 40.

(3) The first tubular member 40, the second tubular member 60, and the braided wire 70 are all made of an aluminum alloy.

With this configuration, the first tubular member 40, the second tubular member 60, and the braided wire 70 are made of the same type of metal material. Accordingly, at a contact portion where the first tubular member 40 and the braided wire 70 are in contact with each other and a contact portion where the braided wire 70 and the second tubular member 60 are in contact with each other, it is possible to suppress galvanic corrosion, which is caused by the infiltration of water between different types of metals. Thus, there is no need to provide separate exterior members for covering the outer circumferences of these contact portions in order to suppress the infiltration of water into the contact portions. Therefore, both an increase in the size of the wire harness 10 and an increase in the number of components in the wire harness 10 can be suppressed.

(4) The protruding portion 63 is provided over the entire length in the circumferential direction of the second tubular member 60.

With this configuration, the protruding portion 63 presses the braided wire 70 against the outer circumferential surface 40b of the first tubular member 40 over the entire length in the circumferential direction. Accordingly, the connection reliability of electrical connection between the braided wire 70 and the first tubular member 40 can be improved.

(5) The braided wire 70 has the first portion 71 that is located between the outer circumferential surface 40b of the first tubular member 40 and the inner circumferential surface 60a of the second tubular member 60, the second portion 72 that is drawn out in a direction opposite to the direction in which the drawn-out portions 21 are drawn out from the first end portion 61 and is folded back toward the outer circumference of the second tubular member 60, and the third portion 73 that extends in the direction in which the drawn-out portions 21 are drawn out.

During assembly of the wire harness that includes the braided wire covering the outer circumferences of the drawn-out portions 21, the drawn-out portions 21 may be attached to the housing 100 of the connector C1 to be connected to an in-vehicle apparatus, and the protector 90 covering the outer circumferences of the drawn-out portions 21 may be fixed to the second tubular member 60. In this case, the braided wire may interfere with the above-mentioned operations.

Here, it is conceivable that the above-mentioned operations are performed in a state in which the braided wire is folded back toward the outer circumference of the first tubular member 40. However, in this case, after the above-mentioned operations are finished, it is necessary to unfold the braided wire and cover the outer circumferences of the drawn-out portions 21 with the braided wire again. Accordingly, workability for assembly of the wire harness may be impaired.

In this respect, with the configuration above, the braided wire 70 fixed to the outer circumferential surface 40b of the first tubular member 40 is drawn out from the first end portion 61 and folded back toward the outer circumference of the second tubular member 60. Thus, the braided wire 70 extends in a direction in which the drawn-out portions 21 are drawn out, while covering the outer circumference of the second tubular member 60. Accordingly, when the braided wire 70 is not folded back toward the outer circumference of the second tubular member 60, the braided wire 70 extends in a direction opposite to the direction in which the drawn-out portions 21 are drawn out, and covers the outer circumference of the first tubular member 40. At this time, the braided wire 70 does not cover the drawn-out portions 21, the protector 90, and the second tubular member 60.

As described above, during the assembly of the wire harness 10, the above-mentioned operations can be easily performed by attaching the braided wire 70 to the first tubular member 40 such that the braided wire 70 covers the outer circumference of the first tubular member 40. Then, the braided wire 70 is folded back toward the outer circumference of the second tubular member 60 after the above-mentioned operations are finished. In such a procedure, the braided wire 70 needs to be folded back only once. Therefore, it is possible to suppress the impairment of workability for assembly of the wire harness 10.

(6) The wire harness 10 further includes the tape member 80 that is wound around the outer circumferential surface of the first end portion 61 of the second tubular member 60 and the second portion 72 of the braided wire 70.

With this configuration, the tape member 80 covers the edge of the first end portion 61, thus making it possible to suppress abrasion of the braided wire 70 caused by contact with this edge.

(7) The wire harness 10 further includes the housing 100 that houses the end portions 21a of the drawn-out portions 21, the shield shell 110 that covers the outer circumference of the housing 100, and the fixing member 120 that fixes the braided wire 70 to the outer surface of the shield shell 110. The braided wire 70, the shield shell 110, and the fixing member 120 are all made of an aluminum alloy.

With this configuration, the braided wire 70, the shield shell 110, and the fixing member 120 are made of the same type of metal material. Accordingly, at a contact portion where the shield shell 110 and the braided wire 70 are in contact with each other and a contact portion where the braided wire 70 and the fixing member 120 are in contact with each other, it is possible to suppress galvanic corrosion, which is caused by the infiltration of water between different types of metals. Thus, there is no need to provide separate exterior members for covering the outer circumferences of these contact portions in order to suppress the infiltration of water into the contact portions. Therefore, both an increase in the size of the wire harness 10 and an increase in the number of components in the wire harness 10 can be suppressed.

(8) The wire harness 10 further includes a sealing member 50 that is provided inside the end portion 41 of the first tubular member 40 and seals a space between the outer circumferential surfaces of the electric wire members 20 and the inner circumferential surface 40a of the first tubular member 40 from water.

With this configuration, it is possible to suppress the infiltration of water into the first tubular member 40 through the end portion 41 of the first tubular member 40.

(9) The protector 90 is in contact with the sealing member 50 in the axial direction of the first tubular member 40.

With this configuration, movement of the sealing member 50 toward the protector 90 in the axial direction of the first tubular member 40 is restricted. Thus, it is possible to suppress the dislodgement of the sealing member 50 from the first tubular member 40. Therefore, it is possible to suppress the impairment of the water sealing properties of the first tubular member 40.

(10) The first tubular member 40 has a protrusion 42 that protrudes from the inner circumferential surface of the first tubular member 40. The protrusion 42 is located on the inside of the sealing member 50 in the axial direction of the first tubular member 40 and faces the sealing member 50.

With this configuration, when the sealing member 50 moves inward in the axial direction of the first tubular member 40, the sealing member 50 comes into contact with the protrusion 42. Thus, it is possible to suppress the movement of the sealing member 50 inward in the axial direction. Therefore, it is possible to perform positioning of the sealing member 50.

(11) The connection portion 22 where the single-core wire 31 of the first electric wire 30 drawn out from the end portion 41 of the first tubular member 40 and the stranded wire 36 of the second electric wire 35 located outside the first tubular member 40 are electrically connected to each other is provided at a portion in the longitudinal direction of each drawn-out portion 21.

Since the single-core wire 31 and the stranded wire 36 overlap each other at the connection portion 22, the size of the cross section of the connection portion 22 may increase. Accordingly, for example, if the first tubular member 40 covers the outer circumferences of the connection portions 22, the inner diameter of the first tubular member 40 needs to be larger than the entire size of the cross sections of the connection portions 22.

In this respect, with the configuration above, the connection portion 22 is provided at a portion in the longitudinal direction of each drawn-out portion 21. That is to say, the connection portions 22 are located outside the first tubular member 40. Accordingly, even if the sizes of the cross sections of the connection portions 22 increase, there is no need to increase the inner diameter of the first tubular member 40. Thus, compared with a configuration in which the first tubular member 40 covers the outer circumferences of the connection portions 22, the inner diameter of the first tubular member 40 can be reduced, thus making it possible to reduce the outer diameter of the first tubular member 40. Therefore, an increase in the size of the wire harness 10 can be suppressed.

(12) The outer circumferences of the connection portions 22 are covered by the protector 90.

With this configuration, it is possible to suppress the interference of the connection portions 22 with objects located around the wire harness 10.

(13) The protector 90 has the insertion portion 91 that covers the outer circumferences of the connection portions 22, and the fixation portion 92 that protrudes from one end surface in the axial direction of the insertion portion 91 and to which the drawn-out portions 21 are to be fixed. The fixation portion 92 is provided at a position that is farther from the end portion 41 of the first tubular member 40 than the insertion portion 91 is, in the longitudinal direction of the drawn-out portions 21.

With this configuration, portions of the drawn-out portions 21 that are fixed to the fixation portion 92 are farther from the end portion 41 of the first tubular member 40 than the connection portions 22 are. Accordingly, even if an external force acts on the drawn-out portions 21, it is possible to suppress the transmission of the external force to the connection portions 22. Therefore, it is possible to suppress the impairment of the connection reliability of the connection portions 22.

Also, with the configuration above, the drawn-out portions 21 are fixed to the fixation portion 92, thus making it easy to control the lengths of the drawn-out portions 21 drawn out from the end portion 41 of the first tubular member 40.

(14) The tape member 81 is used to fix the drawn-out portions 21 to the fixation portion 92.

With this configuration, the tape member 81 is used to fix, to the fixation portion 92, the drawn-out portions 21 inserted into the insertion portion 91, thus making it possible to use a common protector 90 even when the outer diameters of the electric wires at the drawn-out portions 21 vary or the number of electric wires varies.

(15) The protruding portion 63 of the second tubular member 60 and the recessed portion 43 of the first tubular member 40 are formed by performing the swaging processing method on the second tubular member 60 with the braided wire 70 being sandwiched between the second tubular member 60 and the outer circumferential surface 40b of the first tubular member 40.

With this configuration, the second tubular member 60, the braided wire 70, and the first tubular member 40 are plastically deformed at once using the swaging processing method. At this time, at least on the surface of the protruding portion 63, the surface of a portion of the braided wire 70 that is pressed against the recessed portion 43 by the protruding portion 63, and the surface of the recessed portion 43, oxide layers formed on these surfaces are broken. Thus, the electric resistance at the connection portion where the braided wire 70 and the first tubular member 40 are connected to each other is reduced, thus making it possible to improve the connection reliability of this connection portion.

As shown in FIG. 2, the recessed portion 64 and the protruding portion 63 in the second tubular member 60 can be formed such that their positions in the longitudinal direction coincide with or correspond to each other. In a certain example, the depth of the recessed portion 64 and the height of the protruding portion 63 in the second tubular member 60 may be equal to or correspond to each other, and the recess width of the recessed portion 64 and the lateral width of the protruding portion 63 in the second tubular member 60 may be equal to or correspond to each other. The recessed portion 43 and the protrusion 42 of the first tubular member 40 can be formed such that their positions in the longitudinal direction coincide with or correspond to each other. In a certain example, the depth of the recessed portion 43 and the height of the protrusion 42 in the first tubular member 40 may be equal to or correspond to each other, and the width of the recessed portion 43 and the lateral width of the protrusion 42 in the first tubular member 40 may be equal to or correspond to each other.

As in the example shown in FIG. 2, the protruding portion 63, the recessed portion 43, and the protrusion 42 are formed on the inner circumferential surface of the second tubular member 60, the outer circumferential surface of the first tubular member 40, and the inner circumferential surface of the first tubular member 40, respectively, by forming the recessed portion 64 on the outer circumferential surface of the second tubular member 60 in the state in which the first tubular member 40 is inserted into the second tubular member 60, and the first tubular member 40 and the second tubular member 60 partially overlap each other. Therefore, the recessed portion 64 and the protruding portion 63 of the second tubular member 60 and the recessed portion 43 and the protrusion 42 of the first tubular member 40 can be formed such that their positions in the longitudinal direction coincide with or correspond to each other, and/or the recessed portion 64 and the protruding portion 63 of the second tubular member 60 and the recessed portion 43 and the protrusion 42 of the first tubular member 40 can be formed such that their shapes are the same or correspond to each other.

Modified Examples

This embodiment can be implemented with various modifications such as those described below. This embodiment and the following modified examples can be implemented in combination with each other as long as no technical contradiction arises.

A hole that passes through the insertion portion 91 in the axial direction and holds the outer circumference(s) of the drawn-out portion(s) 21 can also be employed as the fixation portion 92. In this case, holes for holding the individual electric wire member 20 may be employed, or a hole for collectively holding the electric wire members 20 may be employed.

For example, a resin zip tie can also be used instead of the tape member 81 to fix the drawn-out portions 21 to the fixation portion 92.

The connection portions 22 may be fixed to the fixation portion 92.

The fixation portion 92 can also be omitted from the protector 90. In this case, the drawn-out portions 21 are not fixed to the protector 90. That is to say, the protector 90 may merely cover the outer circumferences of the drawn-out portions 21.

The insertion portion 91 may cover the outer circumferences of portions of the drawn-out portions 21 other than the connection portions 22. In other words, in each drawn-out portion 21, the connection portion 22 may be provided at a portion located outside the protector 90.

The electric wire member 20 may include only the first electric wire 30 or only the second electric wire 35.

The first electric wire 30 may have the stranded wire 36.

The second electric wire 35 may have the single-core wire 31.

The protrusion 42 may be in contact with the sealing member 50 in the axial direction of the first tubular member 40.

The protrusion 42 can also be omitted from the first tubular member 40. In this case, the protruding portion 63 can be provided at any position in the axial direction of the second tubular member 60 in a portion of the second tubular member 60 in which the first portion 71 is located on the inner circumferential side. For example, the protruding portion 63 may be provided on a portion of the second tubular member 60 that corresponds to the outer circumference of the sealing member 50. Note that, if the protrusion 42 is omitted from the first tubular member 40, it is preferable that the recessed portion 43 is provided at a portion of the outer circumferential surface 40b of the first tubular member 40 that corresponds to the protruding portion 63.

The insertion portion 91 may be provided at a position spaced apart from the sealing member 50 in the axial direction of the first tubular member 40. That is to say, a space may be provided between the insertion portion 91 and the sealing member 50 in the axial direction of the first tubular member 40. In this case, it is preferable that this space is smaller than the length in the axial direction of the sealing member 50. With this configuration, when the sealing member 50 moves toward the protector 90 in the axial direction of the first tubular member 40, the sealing member 50 comes into contact with the insertion portion 91. Thus, it is possible to suppress the dislodgement of the sealing member 50 from the first tubular member 40. Therefore, it is possible to suppress the impairment of the water sealing properties of the first tubular member 40.

The inner diameter of the insertion portion 91 may be equal to the inner diameter of the first tubular member 40 or larger than the inner diameter of the first tubular member 40.

The sealing member 50 can also be omitted.

The braided wire 70, the shield shell 110, and the fixing member 120 may be made of different metal materials. In this case, exterior members can also be provided on the outer circumferences of the contact portion where the shield shell 110 and the braided wire 70 are in contact with each other and the contact portion where the braided wire 70 and the fixing member 120 are in contact with each other.

The tape member 80 can also be omitted.

The braided wire 70 need not be folded back toward the outer circumference of the second tubular member 60. In this case, for example, the braided wire 70 is located between the outer circumferential surface of the protector 90 and the inner circumferential surface 60a of the second tubular member 60 and drawn out from the second end portion 62 of the second tubular member 60. At this time, the braided wire 70 may be provided with openings through which the engagement protrusion 94 and the flange portion 93 of the protector 90 are to be inserted at corresponding positions.

The protruding portion 63 may be provided at a portion in the circumferential direction of the second tubular member 60. Also, a plurality of protruding portions 63 may be provided at intervals in the circumferential direction of the second tubular member 60.

A plurality of protruding portions 63 may be provided at intervals in the axial direction of the second tubular member 60.

The first tubular member 40, the second tubular member 60, and the braided wire 70 may be made of different metal materials. In this case, exterior members can also be provided on the outer circumferences of the contact portion where the first tubular member 40 and the braided wire 70 are in contact with each other and the contact portion where the braided wire 70 and the second tubular member 60 are in contact with each other.

The wire harness 10 may also include a plurality of first tubular members 40. Also, the wire harness 10 may also include a plurality of second tubular members 60.

In each electric wire member 20, a portion covered by the first tubular member 40 may be shorter than a portion covered by the second tubular member 60. That is to say, the first tubular member 40 may be shorter than the second tubular member 60.

The invention claimed is:

1. A wire harness comprising:
an electric wire member;
a first tube that is made of a metal and covers an outer circumference of the electric wire member;
a braided wire that is formed by braiding conductive strands into a tubular shape, is attached to an outer circumferential surface of the first tube, and covers an outer circumference of a drawn-out portion of the electric wire member, the drawn-out portion being drawn out from an end of the first tube;
a second tube that is made of a metal and includes: a first end covering an outer circumference of the first tube with the braided wire being sandwiched between the first end and the outer circumferential surface of the first tube; and a second end located on a side opposite to the first end and covering the outer circumference of the drawn-out portion, and fixes the braided wire to the outer circumferential surface of the first tube; and
a protector that is fixed to an inner circumferential surface of the second tube and protects the drawn-out portion by covering the outer circumference of the drawn-out portion,
wherein the second tube has a protrusion that protrudes from the inner circumferential surface of the second tube toward the outer circumferential surface of the first tube and presses the braided wire against the outer circumferential surface of the first tube, wherein the braided wire has:
- a first portion that is located between the outer circumferential surface of the first tube and the inner circumferential surface of the second tube;
- a second portion that is continuous with the first portion, is drawn out in a direction opposite to a direction in which the drawn-out portion is drawn out from the first end, and is folded back toward an outer circumference of the second tube; and
- a third portion that is continuous with the second portion and extends in the direction in which the drawn-out portion is drawn out, and wherein the wire harness further comprises a tape that is wound around an outer circumferential surface of the first end of the second tube and the second portion of the braided wire.

2. The wire harness according to claim 1,
wherein, in the electric wire member, a portion covered by the first tube is longer than a portion covered by the second tube.

3. The wire harness according to claim 1,
wherein the first tube, the second tube, and the braided wire are all made of an aluminum alloy.

4. The wire harness according to claim 1,
wherein the protrusion is provided over an entire length in a circumferential direction of the second tube.

5. The wire harness according to claim 1, further comprising:
- a housing that houses an end of the drawn-out portion;
- a shield shell that covers an outer circumference of the housing and to which the braided wire is connected; and
- a fixing member that fixes the braided wire, wherein the braided wire, the shield shell, and the fixing member are all made of an aluminum alloy.

6. The wire harness according to claim 1, further comprising
a seal that is provided inside the end of the first tube and seals a space between an outer circumferential surface of the electric wire member and an inner circumferential surface of the first tube from water.

7. The wire harness according to claim 6,
wherein the protector faces the seal in an axial direction of the first tube.

8. The wire harness according to claim 7,
wherein the protector is in contact with the seal in the axial direction of the first tube.

9. The wire harness according to claim 6, wherein:
the first tube has a protrusion that protrudes from the inner circumferential surface of the first tube, and
the protrusion of the first tube is located on an inside of the seal in an axial direction of the first tube and faces the seal.

10. The wire harness according to claim 1, wherein:
the electric wire member includes a first electric wire and a second electric wire that is electrically connected to the first electric wire,
the first electric wire has a single-core wire formed by a single conductor, and an insulating coating that covers an outer circumference of the single-core wire,
the second electric wire has a stranded wire formed by twisting a plurality of metal strands, and an insulating coating that covers an outer circumference of the stranded wire, and
a connection where the first electric wire drawn out from the end of the first tube and the second electric wire located outside the first tube are electrically connected to each other is provided at a portion of the drawn-out portion in a longitudinal direction.

11. The wire harness according to claim 10,
wherein the protector covers an outer circumference of the connection.

12. The wire harness according to claim 1,
wherein the protector has a fixation portion to which the drawn-out portion is fixed.

13. The wire harness according to claim 11, wherein:
the protector has a fixation portion to which the drawn-out portion is fixed, and
the fixation portion is provided at a position that is farther from the end of the first tube than a portion of the protector that covers the outer circumference of the connection is, in the longitudinal direction of the drawn-out portion.

* * * * *